(12) United States Patent
Feng et al.

(10) Patent No.: US 11,087,129 B2
(45) Date of Patent: Aug. 10, 2021

(54) INTERACTIVE VIRTUAL SIMULATION SYSTEM

(71) Applicant: International Business Machines Corporation, Armonk, NY (US)

(72) Inventors: Yicheng Feng, Shanghai (CN); You Miao Zhang, Shanghai (CN); Wei Xd Li, Shanghai (CN); Ao Qiong Li, Shanghai (CN); Shan Shan Zhao, Shanghai (CN); Kun Peng Wang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 195 days.

(21) Appl. No.: 16/226,332

(22) Filed: Dec. 19, 2018

(65) Prior Publication Data
US 2020/0202125 A1 Jun. 25, 2020

(51) Int. Cl.
*G06K 9/00* (2006.01)
*G06T 13/20* (2011.01)
*G06T 13/40* (2011.01)

(52) U.S. Cl.
CPC ..... *G06K 9/00624* (2013.01); *G06K 9/00885* (2013.01); *G06T 13/205* (2013.01); *G06T 13/40* (2013.01)

(58) Field of Classification Search
None
See application file for complete search history.

(56) References Cited

U.S. PATENT DOCUMENTS

| 8,456,379 | B2 | 6/2013 | Hurley et al. | |
|---|---|---|---|---|
| 2010/0194715 | A1 | 8/2010 | Hurley et al. | |
| 2010/0291528 | A1* | 11/2010 | Huerta | G09B 7/00 434/362 |
| 2011/0311100 | A1* | 12/2011 | Fan | G06T 7/248 382/103 |

(Continued)

OTHER PUBLICATIONS

Schneider et al., "Can You Help Me with My Pitch? Studying a Tool for Real-Time Automated Feedback," IEEE Transactions on Learning Technologies, vol. 9, No. 4, Oct.-Dec. 2016, pp. 318-327.

(Continued)

*Primary Examiner* — Kevin Ky
(74) *Attorney, Agent, or Firm* — Zilka-Kotab, P.C.

(57) ABSTRACT

A computer-implemented method, according to one embodiment, includes: sending one or more instructions to a web crawler to identify presentation videos on the internet and capture video data therefrom. In response, video data which corresponds to various presentation videos on the internet is received from the web crawler. The video data is used to define influence factors, such that different combinations of the influence factors represent different conditions of a presenter in the presentation videos. The video data is also used to define labels, where different combinations of the labels represent different conditions of one or more audience members in the presentation videos. Furthermore, structured data is generated by correlating certain presenter conditions with certain audience conditions, and the structured data is stored in memory.

20 Claims, 9 Drawing Sheets

(56) References Cited

U.S. PATENT DOCUMENTS

| | | | |
|---|---|---|---|
| 2016/0049094 A1* | 2/2016 | Gupta | G09B 9/00 434/185 |
| 2016/0077547 A1 | 3/2016 | Aimone et al. | |
| 2016/0170617 A1* | 6/2016 | Shi | G06F 3/0484 345/668 |
| 2017/0169727 A1 | 6/2017 | Briggs et al. | |
| 2017/0193105 A1* | 7/2017 | Cudak | G06F 16/248 |
| 2017/0295404 A1* | 10/2017 | Meredith | H04N 21/4667 |
| 2020/0184256 A1* | 6/2020 | Ye | G08B 13/00 |

OTHER PUBLICATIONS

Gan et al., "Multi-sensor Self-Quantification of Presentations," Proceedings of the 23rd ACM International Conference on Multimedia, 2015, pp. 601-610.

Chollet et al., "Exploring Feedback Strategies to Improve Public Speaking: An Interactive Virtual Audience Framework," ACM, UbiComp, 2015, 13 pages.

VR Rehearsal, "VR Rehearsal, A New Method to Practice Presentation," 2018, 7 pages, retrieved from https://www.etc.cmu.edu/projects/vr-rehearsal/.

Anonymous, "Intelligent and personalized presentation recommendation system," IP.com Prior Art Database, Technical Disclosure No. IPCOM000254379D, Jun. 25, 2018, 8 pages.

Nguyen et al., "Online Feedback System for Public Speakers," IEEE Symposium on E-Learning, E-Management and E-Services, 2012, 5 pages.

Menabney, D., "Can These AI-Powered Tools Help You Perfect Your Next Presentation?" Fast Company, Oct. 26, 2016, 8 pages, retrieved from https://www.fastcompany.com/3064951/can-these-ai-powered-tools-help-you-perfect-your-next-presentation.

* cited by examiner

| Category | Influence Factors | Weight |
|---|---|---|
| Speech Content | Fact / Joke / Question... | 0 |
| Body Movements | Shake Hand / Nod / Walk... | 4 |
| Facial Expressions | Smile / Laugh / Gasp... | 1 |
| Vocal Volume | Loud / Moderate / Low... | 0 |
| Presentation Aid Content | Crowded Slides / Pictures... | 0 |

| Category | Influence Factors | Weight |
|---|---|---|
| Content Type | Fact / Joke / Question... | 4 |
| Body Movements | Shake Hand / Nod / Walk... | 3 |
| Facial Expressions | Smile / Laugh / Gasp... | 2 |
| Vocal Volume | Loud / Moderate / Low... | 1 |

620

| Presenter Condition | (State Fact, Tell Joke, Shake Hand, Smile,..., Loud) |
|---|---|
| Importance Weight | (4, 4, 3, 2,..., 1) |
| Max Importance Weight | 4 |
| Refactored Importance Weight | (1, 1, 0, 1,..., 0) |
| Refactored Presenter Condition | (State Fact, Tell Joke, ~~Shake Hand~~, Smile,..., ~~Loud~~) |

INTERACTIVE VIRTUAL SIMULATION SYSTEM

BACKGROUND

The present invention relates to interactive simulations, and more specifically, this invention relates to interactive virtual audience simulations.

When practicing for a presentation, individuals have implemented different techniques in order to best prepare themselves. While personal preferences vary, most of these techniques involve rehearsing the presentation out loud in an empty room, in front of a mirror, or even an individual who has agreed to evaluate the presenter's preparedness. However, these techniques fall short of providing the same experience or level of feedback that the actual presentation will. Therefore, presenters are often unable to adequately prepare themselves for upcoming presentations, primarily relying on experience and repetition in an attempt to do so.

SUMMARY

A computer-implemented method, according to one embodiment, includes: sending one or more instructions to a web crawler to identify presentation videos on the internet and capture video data therefrom. In response, video data which corresponds to various presentation videos on the internet is received from the web crawler. The video data is used to define influence factors, such that different combinations of the influence factors represent different conditions of a presenter in the presentation videos. The video data is also used to define labels, where different combinations of the labels represent different conditions of one or more audience members in the presentation videos. Furthermore, structured data is generated by correlating certain presenter conditions with certain audience conditions, and the structured data is stored in memory.

A computer program product, according to another embodiment, includes a computer readable storage medium having program instructions embodied therewith. The program instructions are readable and/or executable by a processor to cause the processor to: receive, by the processor, new video data which corresponds to an active presenter. The new video data is used, by the processor, to identify influence factors which correspond to the active presenter. These identified influence factors are used, by the processor, to determine a real-time condition of the active presenter. Structured data from a training model is also used, by the processor, to determine an audience condition which is most closely correlated to the real-time condition of the active presenter. Furthermore, one or more instructions are sent, by the processor, to render a virtual audience according to the one or more audience conditions. The virtual audience is presented visibly to the active presenter.

A system, according to yet another embodiment, includes: memory, a processor, and logic integrated with the processor, executable by the processor, or integrated with and executable by the processor. The logic is configured to: receive, by the processor, new video data which corresponds to an active presenter. The new video data is used, by the processor, to identify influence factors which correspond to the active presenter. These identified influence factors are used, by the processor, to determine a real-time condition of the active presenter. Structured data from a training model is also used, by the processor, to determine an audience condition which is most closely correlated to the real-time condition of the active presenter. Furthermore, one or more instructions are sent, by the processor, to render a virtual audience according to the one or more audience conditions. The virtual audience is presented visibly to the active presenter. Moreover, the structured data is stored in the memory.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4D is a representational view of a table which includes a number of influence factors in accordance with one embodiment.

FIG. 6 is a representational view of tables which include information which corresponds to various influence factors in accordance with an in-use example.

DETAILED DESCRIPTION

Figure 1:
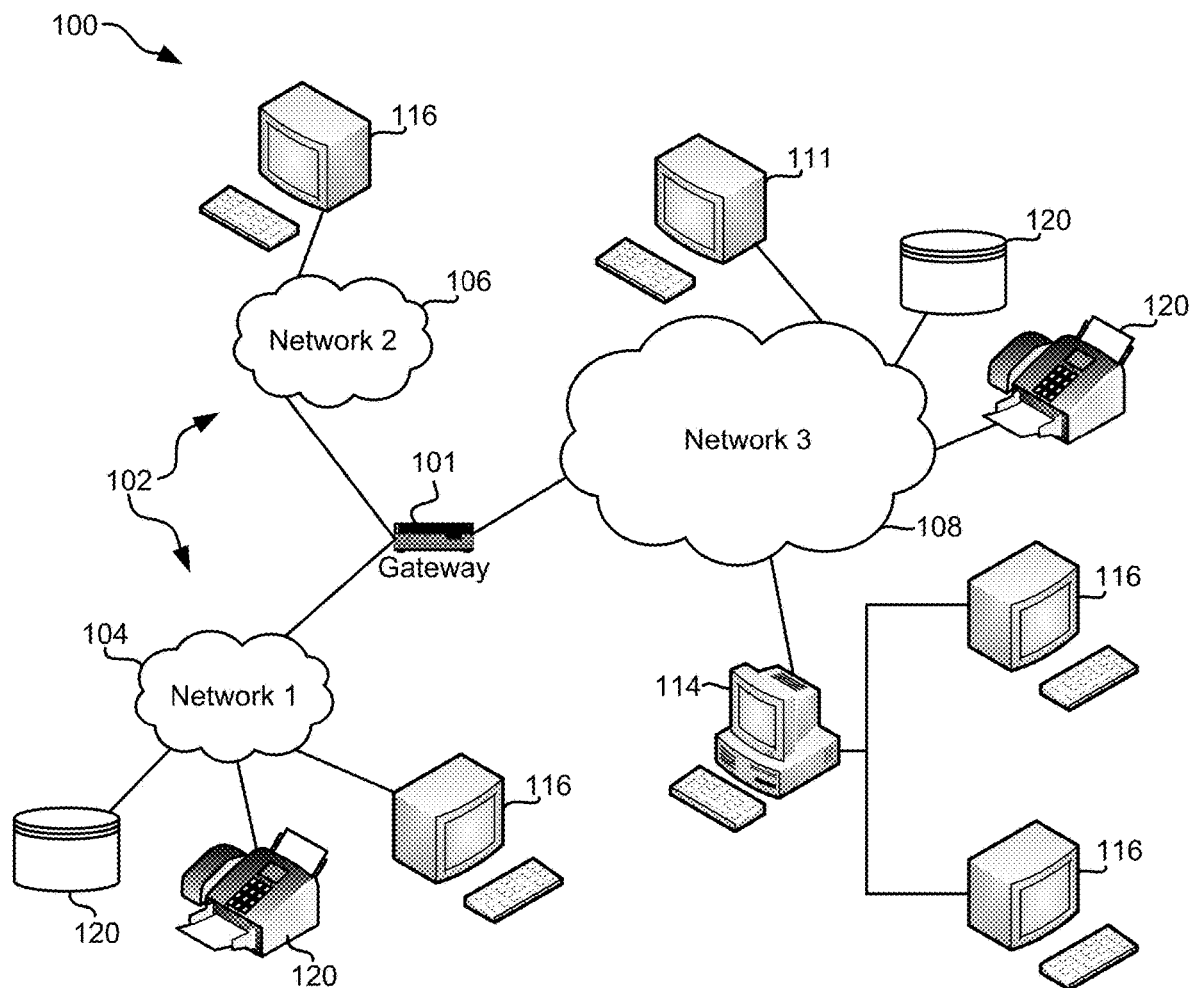
FIG. 1 is a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for utilizing presentation information which corresponds to actual performances to generate a training model which is able to accurately simulate how audience members are predicted to react to a presenter's performance in real-time. In other words, as a presenter practices their presentation, embodiments included herein are able to detect various details about the presenter's specific actions, the content of their presentation, the manner in which the presentation is being delivered, etc. and render an accurate representation of how the audience is predicted to react using artificial intelligence. Moreover, the audience's reactions are displayed for the presenter (e.g., using a projector, VR headset, etc.) such that they are able to practice their presentation in an environment which depicts how the audience is expected to act during the actual presentation, e.g., as will be described in further detail below.

In one general embodiment, a computer-implemented method includes: sending one or more instructions to a web crawler to identify presentation videos on the internet and capture video data therefrom. In response, video data which corresponds to various presentation videos on the internet is received from the web crawler. The video data is used to define influence factors, such that different combinations of the influence factors represent different conditions of a presenter in the presentation videos. The video data is also used to define labels, where different combinations of the labels represent different conditions of one or more audience members in the presentation videos. Furthermore, structured data is generated by correlating certain presenter conditions with certain audience conditions, and the structured data is stored in memory.

In another general embodiment, a computer program product includes a computer readable storage medium having program instructions embodied therewith. The program instructions are readable and/or executable by a processor to cause the processor to: receive, by the processor, new video data which corresponds to an active presenter. The new video data is used, by the processor, to identify influence factors which correspond to the active presenter. These identified influence factors are used, by the processor, to determine a real-time condition of the active presenter. Structured data from a training model is also used, by the processor, to determine an audience condition which is most closely correlated to the real-time condition of the active presenter. Furthermore, one or more instructions are sent, by the processor, to render a virtual audience according to the one or more audience conditions. The virtual audience is presented visibly to the active presenter.

In yet another general embodiment, a system includes: memory, a processor, and logic integrated with the processor, executable by the processor, or integrated with and executable by the processor. The logic is configured to: receive, by the processor, new video data which corresponds to an active presenter. The new video data is used, by the processor, to identify influence factors which correspond to the active presenter. These identified influence factors are used, by the processor, to determine a real-time condition of the active presenter. Structured data from a training model is also used, by the processor, to determine an audience condition which is most closely correlated to the real-time condition of the active presenter. Furthermore, one or more instructions are sent, by the processor, to render a virtual audience according to the one or more audience conditions. The virtual audience is presented visibly to the active presenter. Moreover, the structured data is stored in the memory.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
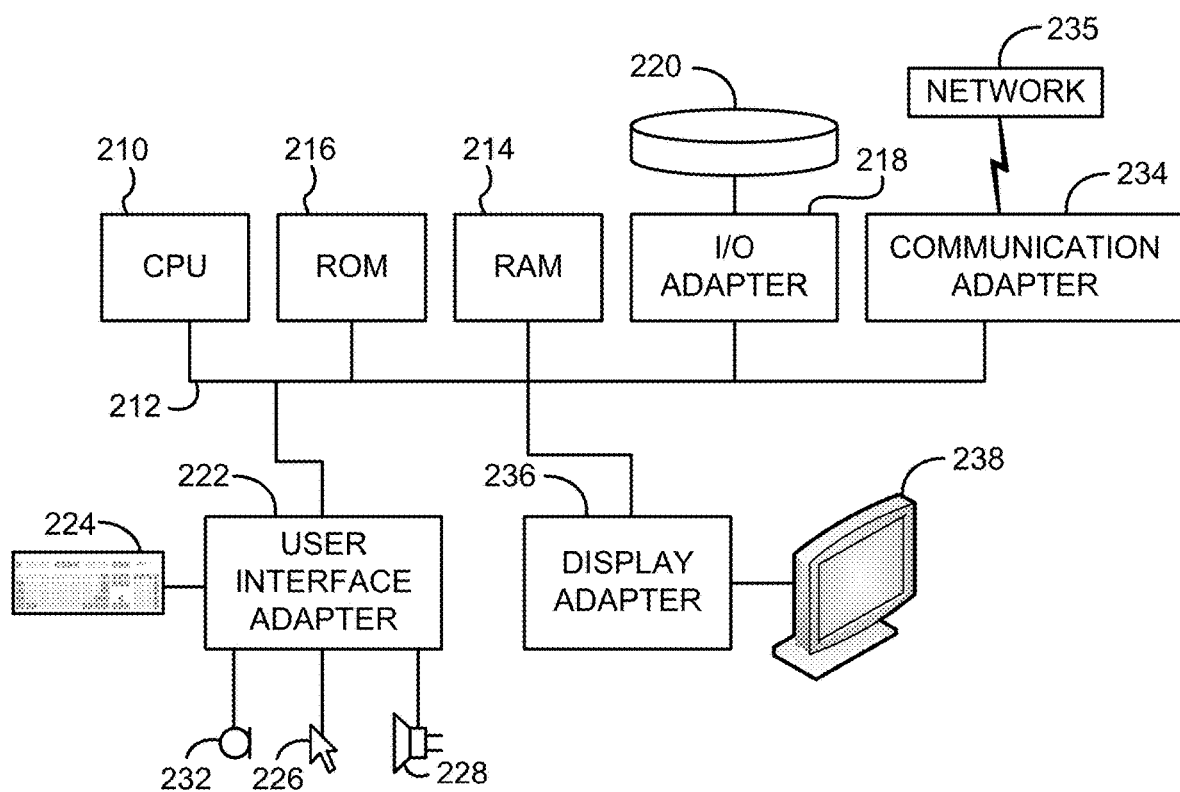
FIG. 2 is a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
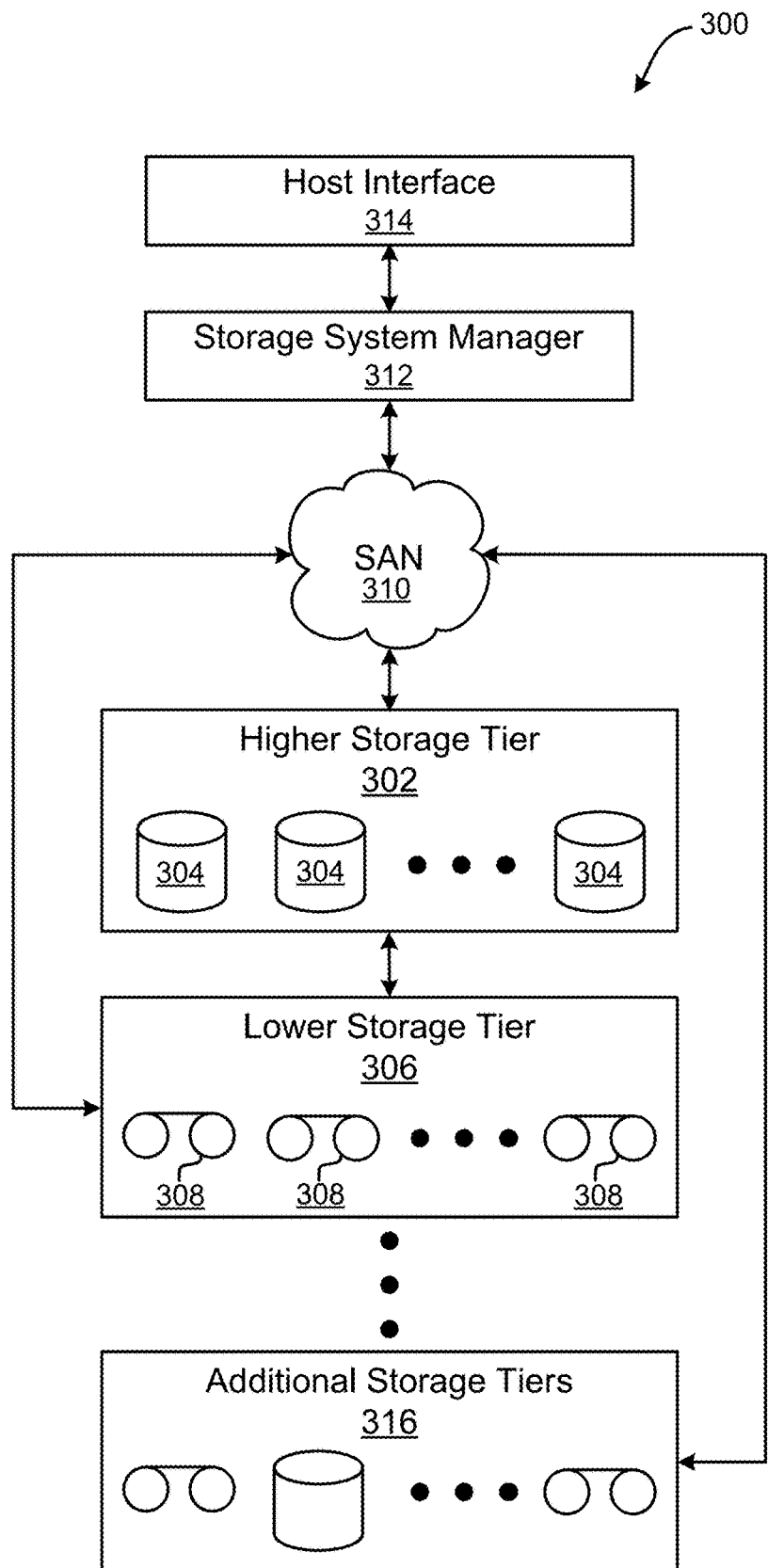
FIG. 3 is a representational view of a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

As mentioned above, when practicing for a presentation, individuals have implemented different techniques in order to best prepare themselves. While personal preferences vary, most of these techniques involve rehearsing the presentation out loud in an empty room, in front of a mirror, or even an individual who has agreed to evaluate the presenter's preparedness. However, these techniques fall short of providing the same experience or level of feedback that the actual presentation will. For instance, even one or more acting audience members will issue their feedback based on their personal opinions which may be significantly different than how the actual audience will interpret the presentation and/or react.

For instance, the presenter is not able to experience receiving genuine responses from a larger group of audience members. Without this genuine response, rehearsal simply improves the presenter's familiarity with the content of the presentation, but does not improve their overall presentation capability. Therefore, presenters are often unable to adequately prepare themselves for upcoming presentations, primarily relying on experience and repetition in an attempt to do so.

In sharp contrast to these shortcomings which have conventionally been experienced, various ones of the embodiments included herein are able to provide a real-time virtual audience simulation which interacts with the presenter based on the presenter's actual performance. In other words, some of the embodiments described herein are able to automatically simulate audience responses by analyzing the presenter's state while practicing the presentation. As a result, a number of the approaches herein are able to provide an environment which is substantially similar to an actual presentation environment, including an audience which interacts with the presenter in real-time based on a number of factors. This desirably provides the presenter with detailed feedback and an environment which is substantially similar to that of the actual presentation, thereby allowing the presenter to significantly improve the intended effect of their presentation, e.g., as will be described in further detail below.

Figure 4A:
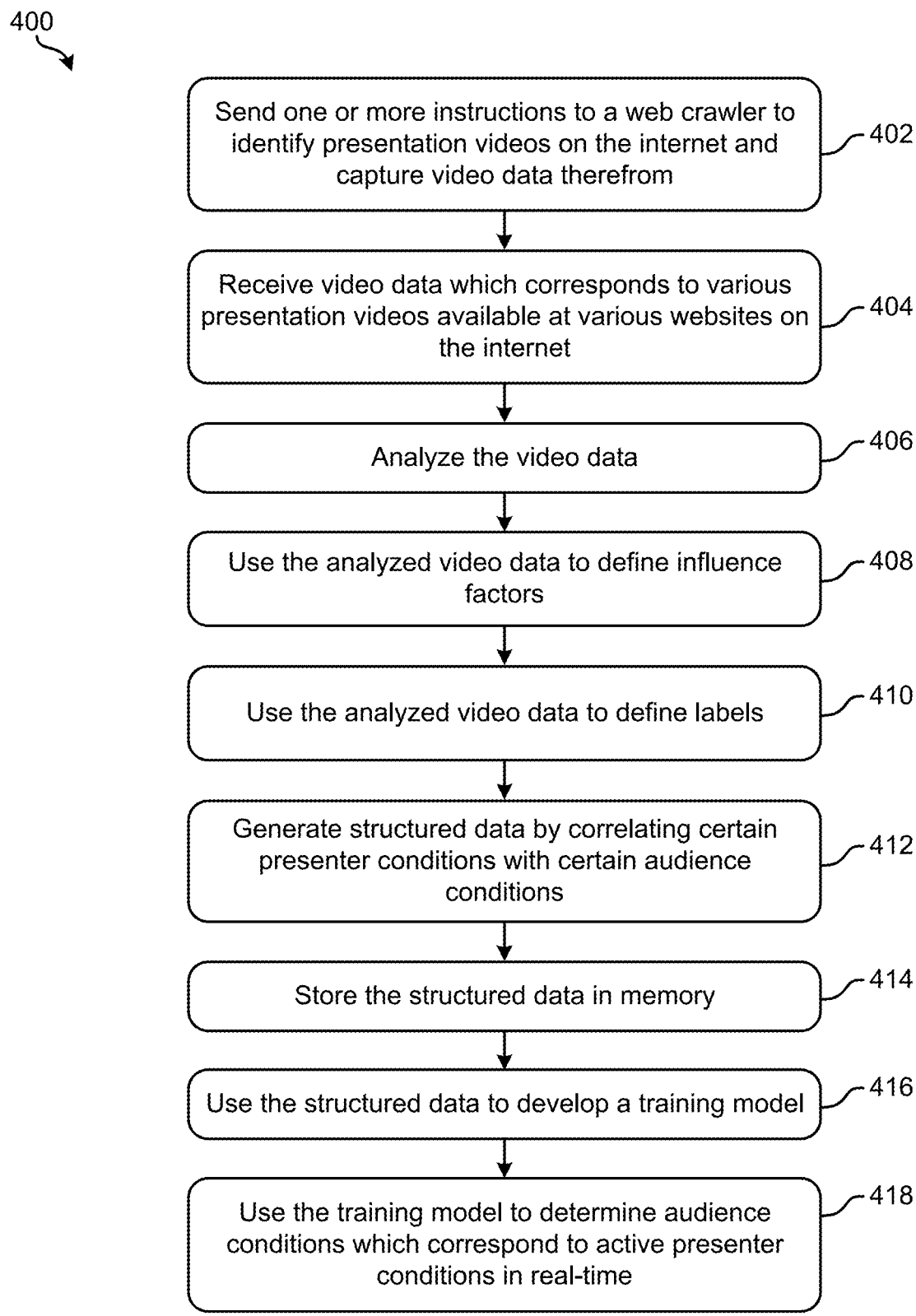
FIG. 4A is a flowchart of a method in accordance with one embodiment.

Referring to FIG. 4A, a flowchart of a method 400 is shown according to one embodiment. The method 400 may be performed in accordance with the present invention in any of the environments depicted in FIGS. 1-3, among others, in various embodiments. Of course, more or less operations than those specifically described in FIG. 4A may be included in method 400, as would be understood by one of skill in the art upon reading the present descriptions.

Each of the steps of the method 400 may be performed by any suitable component of the operating environment. For example, in various embodiments, the method 400 may be partially or entirely performed by a controller, a processor, a computer, etc., or some other device having one or more processors therein. Thus, in some embodiments, method 400 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

As shown in FIG. 4A, operation 402 of method 400 includes sending one or more instructions to a web crawler to identify presentation videos on the internet and capture video data therefrom. In some approaches, the web crawler is already be actively inspecting web pages on the internet whereby the one or more instructions sent in operation 402 may be stored in a queue, prioritized over a current task, rejected, etc. In other approaches, the web crawler is activated in response to receiving the one or more instructions. In still other approaches, more than one web crawler may be used.

Any type of web crawler which would be apparent to one skilled in the art after reading the present description may be implemented, e.g., depending on the desired approach. Moreover, the video data may be captured in a number of different ways. For instance, in some approaches the web crawler extracts video data from an identified presentation video by inspecting the source code (e.g., Hypertext Markup Language (HTML) source code) of the corresponding web page and extracting the relevant video data.

In some approaches, search filters may be included in the one or more instructions sent in operation 402. The search filters introduce factors which assist the web crawlers in identifying videos which are likely to include desirable content which corresponds to actual presentations. For example, search filters may specify that the web crawler(s) search for videos with the word "speech" in their title, videos which have been tagged with the search term "audience", videos which have been organized under a "presentation" catalog, etc. It follows that the precision of the data received from the one or more web crawlers is improved in approaches which implement search filters.

The video data itself may also vary in type depending on the approach. According to some approaches, the video data captured from an identified presentation video includes raw video data, compressed video data, uncompressed video data, etc. With respect to the present description, "raw video data" is intended to refer to the unprocessed imaging data captured by a camera's image sensor. Raw video data is preferred in some approaches in view of the high image quality that is retained therein. For example, because raw video data is unrefined, the footage remains as it was captured, retaining an extensive amount of details, e.g., such as true colors, true lighting, additional image complexity, etc., which provides a considerable opportunity for image modification downstream.

Proceeding to operation 404, video data which corresponds to various presentation videos available at various websites on the internet is received from the web crawler. The video data may be received in bunches, as a continuous stream, as a single batch, etc., depending on the desired approach. Moreover, upon being received, the video data is preferably stored in memory such that it may be retained.

Operation 406 further includes analyzing the video data. The analyzation of the video data preferably takes particular note of the presenter's actions as well as how the audience members react to those actions. For example, analyzing the video data may reveal how loudly the presenter was speaking, what (if any) body gestures were made by the presenter, a speed at which the presenter spoke, the content displayed to the audience using a visual aid, what (if any) facial expressions were made by the presenter, etc., at each point throughout the presentation. Similarly, analyzing the video data may reveal how many audience members maintained eye contact with the presenter, spoke with one or more other audience members, laughed, applauded, used their mobile device, etc., at each point throughout the presentation.

Accordingly, the reaction identified for each of the audience members at a given point in time may be correlated with the presenter's actions at that given point in time, thereby deriving how each of the audience members reacted to each of the presenter's specific actions during the presentation. Moreover, various ones of these correlations can be aggregated in a training model to determine an accurate representation of how each member in an audience is predicted to react to various combinations of actions performed by the presenter. Moreover, this information may further be used to actually depict a virtual simulation of an audience which reacts in real-time to a presenter's actions while practicing a presentation, e.g., as will be described in further detail below.

Referring still to FIG. 4A, method 400 includes using the analyzed video data to define influence factors. See operation 408. Each of the influence factors corresponds to a specific action performed by a presenter in one of the presentation videos from which the video data was captured. For instance, each of the influence factors may correspond to a given category, e.g., such as audio content (e.g., what the presenter is actually saying), body movements, facial expressions, audio volume, visual aid content (e.g., the content and/or style of visual aids presented to the audience), etc. According to more exemplary approaches, an influence factor may correspond to the presenter telling a joke to the audience, asking the audience a question, pointing towards a visual aid being used, increasing the volume of their voice, increasing the speed at which they are speaking, etc. Accordingly, by determining which of these various influence factors are at play at a given point in time, a "condition" of the presenter which corresponds to these influence factors can be represented in detail. In other words, different combinations of active influence factors are able to represent (e.g., define) the specific condition a presenter has at a specific point in time during a respective presentation video.

Moving to operation 410, the analyzed video data is also used to define labels. Similar to the aforementioned influence factors, each of the labels corresponds to a specific action performed by one or more of the audience members in one of the presentation videos from which the video data was captured. For instance, each of the labels may correspond to a given category, e.g., such as body movements, facial expressions, line of sight, etc. More specifically, a label may correspond to at least one of the audience members laughing, applauding, accessing their mobile device, taking notes, speaking to a nearby audience member, sleeping, raising a hand, etc. Accordingly, by determining which of these various labels are at play at a given point in time, a "condition" of the audience members which corresponds to these labels can be represented in detail. In other words, different combinations of active labels are able to represent (e.g., define) the specific condition various audience members have at a specific point in time during a respective presentation video.

Operation 412 further includes generating structured data by correlating certain presenter conditions with certain audience conditions. As mentioned above, the status of each audience member at a given point in time may be represented using various labels, while the status of the presenter at a given point in time may be represented using various influence factors. Thus, by identifying certain influence factors which are active at the same time as certain labels, specific presenter conditions may be correlated with certain audience conditions.

According to an example, which is in no way intended to limit the invention, an influence factor which corresponds to the presenter using an excessive number of modal particles (e.g., such as "hmm", "umm", "oops", etc.) is identified as typically being active at the same time as labels which correspond to one or more of the audience members becoming disengaged from the presentation (e.g., such as whispering to other audience members, accessing their mobile devices, etc.). Thus, presenter conditions determined as including excessive modal particles may be correlated with audience conditions which are generally disengaged from the presentation in a structured data pair. Again, this information may further be used to actually depict a virtual simulation of an audience which reacts in real-time to a presenter's conditions while practicing a presentation, e.g., as will be described in further detail below.

Figure 4B:
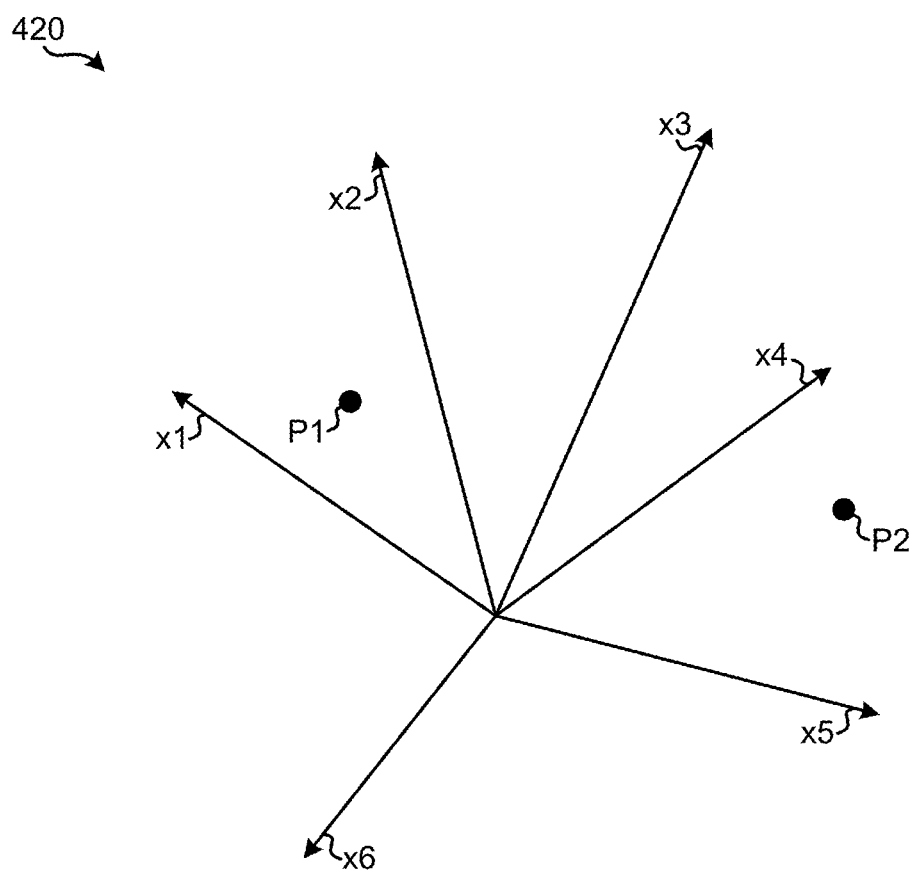
FIG. 4B is a multi-axis graph plotting structured data points with respect to various corresponding influence factors in accordance with one embodiment.

The structured data may be stored and/or represented in any desired manner. For example, in some approaches the structure data is stored in a lookup table such that each entry therein includes values which represent a presenter condition as well as values which represent the audience condition which is correlated thereto. In other approaches the structured data is represented as data points which are plotted on representational graph having multiple axes. According to an example which is in no way intended to limit the invention, FIG. 4B illustrates a graph 420 which includes multiple different axes x1, x2, x3, x4, x5, x6, where each of the axes represents a different influence factor. Accordingly, each of the points plotted on the graph 420 may be used to represent a different presenter condition which corresponds to a different point in time during a given presentation. Each of these points P1, P2 may also correlate to a specific audience condition which represents how members of the audience acted in response to the respective presenter conditions. For instance, the presenter condition represented by P1 may be correlated to a specific audience condition for which 50% of the audience members were smiling, 30% of the audience members were applauding, 15% of the audience members were cheering, and 5% of the audience members were talking amongst themselves, while the presenter condition represented by P2 may be correlated to a specific audience condition for which 50% of the audience members were asleep, 20% of the audience members were chatting amongst themselves, 25% of the audience members were shaking their head, and 5% of the audience members were paying attention to their mobile devices.

Referring back to FIG. 4A, method 400 also includes storing the structured data in memory. See operation 414. The type, location, size, etc. of the memory used to store the structure data varies depending on the desired approach. Further still, operation 416 includes using the structured data to develop a training model. Information corresponding to the training model is also stored in the memory in some approaches, and is preferably used to determine an audience condition which is most closely correlated to a given presenter condition. The training model is thereby used in some approaches to achieve a virtual audience simulation which is able to accurately represent and display the condition (e.g., reactions) of various audience members in response to the real-time conditions (e.g., actions) of a presenter. Accordingly, operation 418 includes using the training model to determine audience conditions which correspond to active presenter conditions in real-time.

It should be noted that any one or more of the operations included in method 400 may be repeated over time depending on the desired approach. For instance, video data may continue to be received from one or more web crawlers even after a training model has been developed, e.g., in order to further improve accuracy of the training model, better represent a specific presentation scenario defined by a user, reflect current trends, etc. Thus, the influence factors, labels and/or correlations therebetween may continue to be updated in the training model over time, e.g., as would be appreciated by one skilled in the art after reading the present description.

Figure 4C:
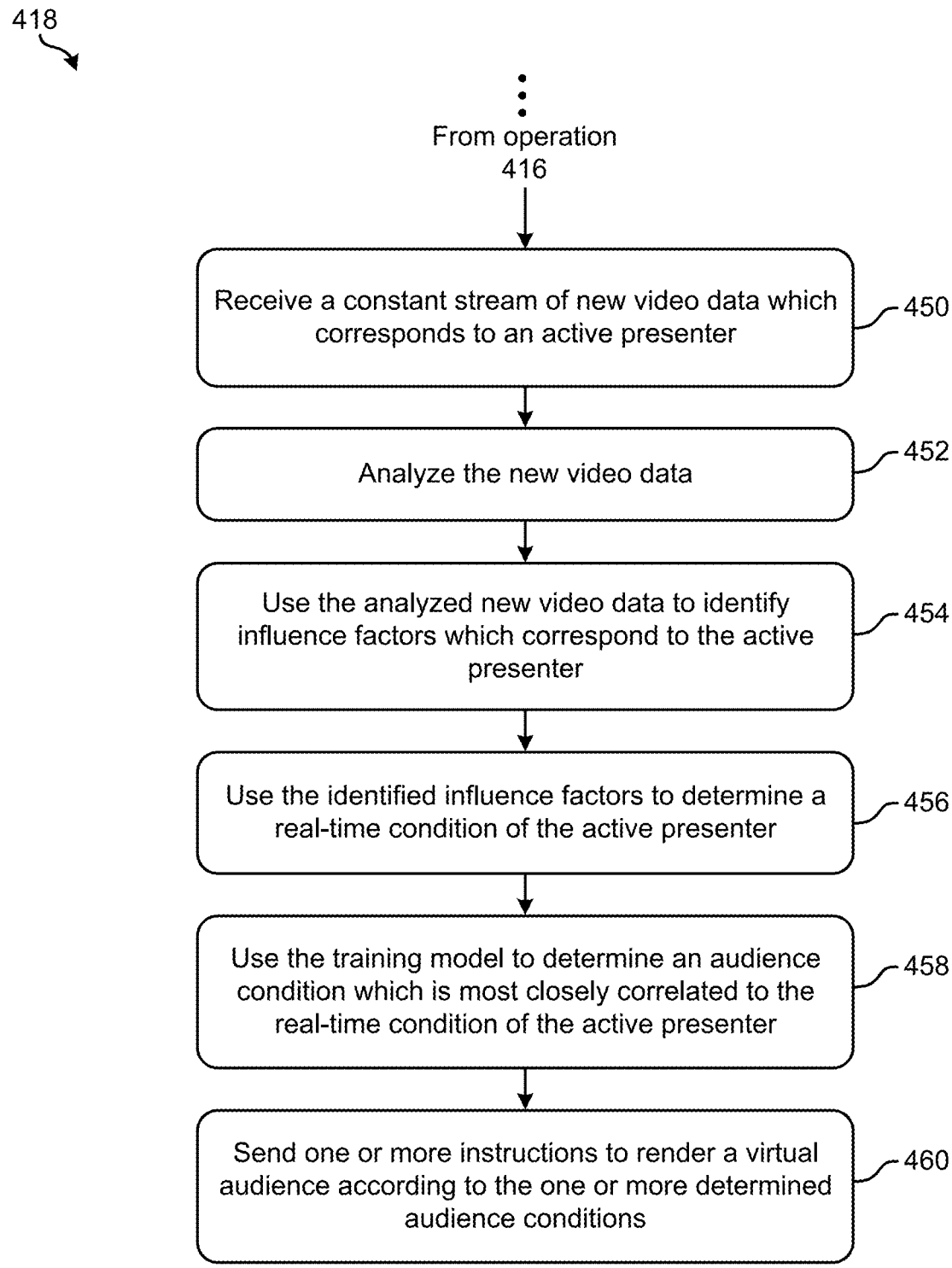
FIG. 4C is a flowchart of sub-processes for one of the operations in the method of FIG. 4A, in accordance with one embodiment.

Looking to FIG. 4C, exemplary sub-processes of using the training model to determine audience conditions which correspond to active presenter conditions in real-time are illustrated in accordance with one embodiment, one or more of which may be used to perform operation 418 of FIG. 4A. However, it should be noted that the sub-processes of FIG. 4C are illustrated in accordance with one embodiment which is in no way intended to limit the invention.

As shown, the flowchart includes receiving a constant stream of new (e.g., real-time) video data which corresponds to an active presenter. See sub-operation 450. In some approaches, this stream of new video data is captured by a video recording device which is located in view of the active presenter. It follows that in some approaches the active presenter may position themselves in a field of view of the video recording device before beginning their presentation. Yet in other approaches, the video recording device may be coupled to a motion detector having a broader field of view which is able to detect the presenter's location. The presenter's location may thereby be used to adjust an orientation, focal length, image capture setting (e.g., frame rate), etc. to best suit the situation. Moreover, the video data may be captured and/or received in any desired format.

Sub-operation 452 further includes analyzing the new video data, while sub-operation 454 includes using the analyzed new video data to identify influence factors which correspond to the active presenter. According to an illustrative approach which is in no way intended to be limiting, video and/or image processing of a type known in the art may be applied to the new video data to identify the various influence factors which correspond to the active presenter. However, the process of using the analyzed new video data to identifying influence factors may include any one or more of the approaches described above, e.g., with respect to operation 408 of FIG. 4A. Again, each of the influence factors preferably correspond to a specific action performed by the active presenter. For instance, an influence factor may involve whether the active presenter is telling the audience a statistic, telling the audience a story, pointing at the audience, speaking with an accent, decreasing the speed at which they are speaking, etc.

Thus, by determining which of these various influence factors are at play in the new video data at a given point in time, the "condition" of the active presenter can be represented in detail. In other words, different combinations of active influence factors are able to represent (e.g., define) the specific condition of the active presenter at any point in time while presenting. It follows that sub-operation 456 of FIG. 4C includes using the identified influence factors to determine a real-time condition of the active presenter.

Sub-operation 458 further includes using the training model to determine an audience condition which is most closely correlated to the real-time condition of the active presenter. As mentioned above, various ones of the correlations made between certain presenter conditions and certain audience conditions can be aggregated in a training model which may in turn be used to determine an accurate representation of how each member in an audience is predicted to react to various actions performed by the active presenter. Moreover, this determination may be made in real-time and used to actually depict a virtual simulation of an audience which reacts to changes in the active presenter's condition while conducting a mock ("practice") presentation.

In some situations, a presenter may have one or more specific areas of their presentation that they wish to improve. For example, a presenter which feels confident in the content of their visual aid (e.g., slide presentation) but uncomfortable in their ability to persuasively voice their presentation may decide to emphasize the audible portion of their mock presentation while downplaying the visual portion thereof. According to one approach, this may be achieved by applying weighted values which increase influence factors which correspond to predetermined areas the presenter wishes to emphasize and weighted values which decrease influence factors which correspond to predetermined areas the presenter wishes to de-emphasize. As a result, the audience condition may be more easily affected by the influence factors that the presenter wishes to emphasize.

The process of actually using the training model to determine the audience condition which is most closely correlated to a real-time condition of an active presenter may also be performed differently depending on the approach. For instance, in some approaches the influence factors included in the real-time condition of the active presenter may be used to form a vector quantity which corresponds to a multi-axis graph (e.g., see FIG. 4B above). Moreover, the relative complexity of the vector quantity corresponds to the number of influence factors included in the real-time condition of the active presenter.

According to an example, which is in no way intended to limit the invention, FIG. 4D depicts a table 470 which represents the influence factors which may be used to express an exemplary presenter condition. As shown, table 470 includes a number of influence factor categories in the Category column, a number of influence factors in the Influence Factors column, and weighted values in the Weight column. Looking specifically to the weighted values applied to each of the different influence factor categories, categories involving speech content, vocal volume and presentation aid content are discredited with respect to determining a corresponding presenter condition, while body movements and facial expressions are emphasized. More specifically, influence factors corresponding to the body movement category have a weighted value of 4, while influence factors corresponding to the facial expression category have a weighted value of 1. It follows that the presenter's body movements will influence the audience condition much more heavily than the presenter's facial expressions.

Referring still to FIG. 4D, the influence factors identified as corresponding to a given presenter a given point in time are used to form a vector quantity. Each of the influence factors are further multiplied by their respective weighted value to produce a resultant presenter condition Pr. Similarly, the weighted values are applied to each of the structured data points in the training model, after which a distance is calculated between the resultant presenter condition Pr and every one of the structured data points. Moreover, the structured data point determined as having a shortest distance to the resultant presenter condition Pr is selected, and the audience condition included in the selected structured data point is designated as the audience condition which is most closely correlated to a real-time condition of the active presenter.

According to some approaches, Equation 1 below may be used to calculate one or more of the distances.

$$W_{ur} = \frac{|N(u) \cap N(r)|}{\sqrt{|N(u)| \times |N(r)|}} \quad \text{Equation 1}$$

However, in other approaches Equation 2 may be used to calculate one or more of the distances between a presenter condition and each of the structured data points, e.g., as would be appreciated by one skilled in the art after reading the present description.

$$W_{ur} = \frac{|N(u) \cap N(r)|}{|N(u) \times N(r)|} \quad \text{Equation 2}$$

For both Equation 1 and Equation 2, $W_{ur}$ represents the distance between a given presenter condition (e.g., Pr above) and a given structured data point, N(r) represents a collection of tags of the given presenter condition, and N(u) represents a collection of tags for a given structured data point. Accordingly, Equation 1 and/or Equation 2 may be used in sub-operation 458 to determine the structured data point which has a shortest distance to a given presenter condition.

However, in some situations more than one structured data point may be determined as having a same (e.g., substantially similar) closest distance to the given presenter condition. In other words, two or more of the structured data points may be equally close to the given presenter condition. In response to determining that two or more audience conditions have a same closest distance to the given presenter condition, an average of the two or more audience conditions is preferably calculated. However, in other approaches median, mode, etc. values may ultimately be selected, e.g., depending on the desired approach.

According to another example, Equation 3.1, Equation 3.2, Equation 3.3, and Equation 3.4, may be used to calculate an average $R_{AVG}$ of two or more audience conditions R1, R2, ..., Rn included in two or more structured data points which are equally close to the given presenter condition.

$$R1 = (\text{Label1}P1, \text{Label2}P1, \text{Label3}P1, \ldots, \text{Label}nP1) \quad \text{Equation 3.1}$$

$$R2 = (\text{Label1}P2, \text{Label2}P2, \text{Label3}P2, \ldots, \text{Label}nP2) \quad \text{Equation 3.2}$$

$$Rn = (\text{Label1}Pn, \text{Label2}Pn, \text{Label3}Pn, \ldots, \text{Label}nPn) \quad \text{Equation 3.3}$$

$$R_{AVG} = \left( \frac{1}{n} \sum_{k=1}^{n} \binom{n}{k} \text{Label1}Pn, \right.$$
$$\left. \frac{1}{n} \sum_{k=1}^{n} \binom{n}{k} \text{Label2}Pn, \ldots, \frac{1}{n} \sum_{k=1}^{n} \binom{n}{k} \text{Label}nPn \right) \quad \text{Equation 3.4}$$

Here, each of the audience conditions R1, R2, ..., Rn are represented by "n" different labels in a vector quantity. Furthermore, the average $R_{AVG}$ audience condition is calculated in Equation 3.4 by averaging each of the labels included in each of the different audience conditions R1, R2, ..., Rn.

Referring back to FIG. 4C, sub-operation 460 includes sending one or more instructions to render a virtual audience according to the one or more audience conditions determined in sub-operation 458. The virtual audience is preferably presented visibly to the active presenter, e.g., on a display monitor or screen, using a projector, in a virtual reality (VR) headset, etc. Additional details such as sounds, temperatures, smells, etc. may also be reproduced in a way to further replicate the actual presentation environment, e.g., as would be appreciated by one skilled in the art after reading the present description.

Figure 5:
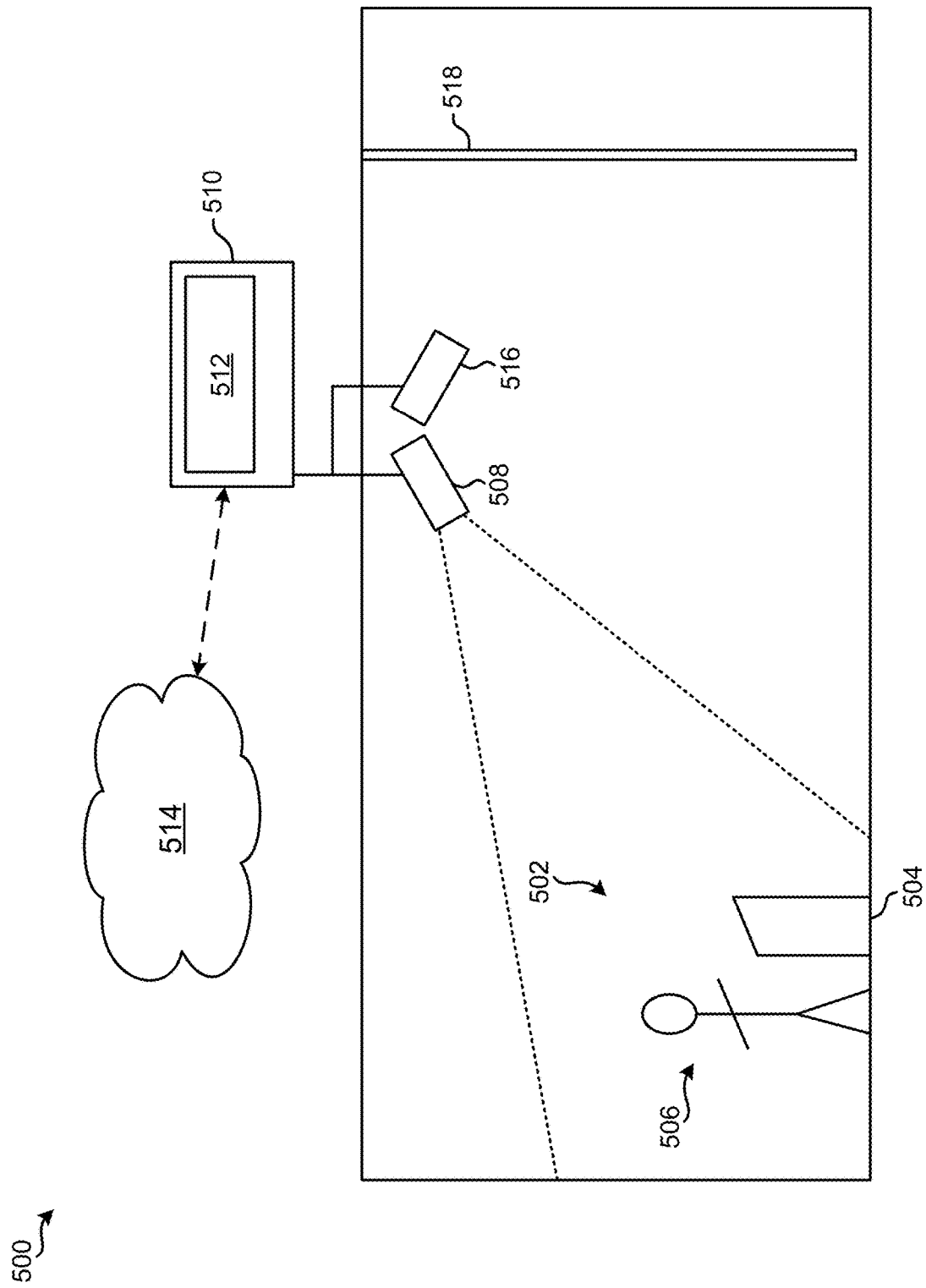
FIG. 5 is a partial representational view of an interactive system in accordance with one embodiment.

For instance, referring now to FIG. 5, an interactive system 500 which is able to provide a virtual audience simulation, is illustrated in accordance with one embodiment. As an option, the present interactive system 500 may be implemented in conjunction with features from any other embodiment listed herein, such as those described with reference to the other FIGS., such as FIGS. 4A-4C. However, such interactive system 500 and others presented herein may be used in various applications and/or in permutations which may or may not be specifically described in the illustrative embodiments listed herein. Further, the interactive system 500 presented herein may be used in any desired environment. Thus FIG. 5 (and the other FIGS.) may be deemed to include any possible permutation.

According to the illustrative embodiment, the interactive system 500 includes a designated presentation area 502 which has a podium 504 at which the active presenter 506 may choose to stand. The designated presentation area 502 is in a field of view of a video recorder 508 (represented by the dashed lines extending from the video recorder 508). Moreover, the video recorder 508 may be coupled to a support arm which extends from the ceiling, extends from a wall, is positioned on the floor, etc. depending on the desired approach.

The video recorder 508 is also electrically coupled to a controller 510 (e.g., processor). The controller 510 is also coupled to a projector 516 which is configured to project images on a surface, e.g., such as screen 518. It follows that in preferred approaches, the controller 510 is able to perform any one or more of the processes and/or sub-processes of FIGS. 4A-4C. Accordingly, the controller 510 includes memory 512, and is further coupled to a network 514. The network 514 may be of any type, e.g., depending on the desired approach. For instance, in some approaches the network 514 is a WAN, e.g., such as the Internet. However, an illustrative list of other network types which network 514 may implement includes, but is not limited to, a LAN, a PSTN, a SAN, an internal telephone network, etc. Accordingly, the controller 510 is able to communicate with one or more web crawlers, e.g., as would be appreciated by one skilled in the art after reading the present description.

It follows that various ones of the embodiments included herein are able to utilize presentation information which corresponds to actual performances to generate a training model which is able to accurately simulate how audience members are predicted to react to a presenter's performance in real-time. In other words, as a presenter practices their presentation, embodiments included herein are able to detect various details about the presenter's actions, the content of their presentation, the manner in which the presentation is being delivered, etc. and render an accurate representation of how the audience is predicted to react using artificial intelligence. Moreover, the audience's reactions are displayed for the presenter (e.g., using a VR headset) such that they are able to practice their presentation in an environment which depicts how the audience is expected to act during the actual presentation. This real-time audience feedback and detailed environment thereby allows presenters the ability to significantly improve the intended effect of their presentation.

According to an in-use example, which is in no way intended to limit the invention, FIG. 6 includes two tables 610, 620. Tables 610 includes a number of influence factors and related information which correspond to structured data derived from video data gathered from various presentation videos and/or user input, while table 620 includes actual presentation data gathered in real-time from a practice presentation.

Looking specifically to table 610, categories have been identified for each of the possible influence factors, as well as relative importance weights. In the present in-use example, the larger the importance weight, the greater an effect influence factors from the corresponding category have on the audience's condition, e.g., as mentioned above. Thus, here influence factors which fall in the category of presentation content have the greatest effect on the audience's condition, while influence factors which fall in the category of vocal volume have the smallest effect on the audience's condition.

Table 620 identifies that the presenter condition at a given point in the presentation includes the influence factors listed in the vector in the Presenter Condition row, while the Importance Weight row identifies the importance weight vector applied to each of the respective influence factors in the influence factor vector (e.g., using the weights included in table 610). Here, a maximum importance weight vector is further applied to the importance weight vector. Specifically, the maximum importance weight vector maintains weights which are deemed as being "important" (or at least relevant) for the given situation, while canceling weights which are deemed as not being important. This achieves a refactored presenter condition vector in the Refactored Presenter Condition row, which in turn will produce an audience condition (e.g., response) which corresponds to the refactored presenter condition. This providing an opportunity to further adjust audience responses based on the given situation, e.g., known details about the venue at which the presentation will take place, user preferences, audience size and/or tendencies, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
   receiving new video data which corresponds to an active presenter;
   using the new video data to identify influence factors which correspond to the active presenter;
   using the identified influence factors to determine a real-time condition of the active presenter;
   using structured data from a training model to determine an audience condition which is most closely correlated to the real-time condition of the active presenter; and
   sending one or more instructions to render a virtual simulation of an audience according to the one or more audience conditions, wherein the virtual simulation of the audience is presented visibly to the active presenter,
   wherein generating the structured data includes:
      sending one or more instructions to a web crawler to identify presentation videos on the internet and capture video data therefrom, and
      receiving, from the web crawler, video data which corresponds to various presentation videos on the internet,
      wherein capturing video data from the identified presentation videos on the internet includes:
         inspecting source code of existing web pages which correspond to the identified presentation videos, and
         using the source code to obtain the video data.

2. The computer-implemented method of claim 1, comprising:
   using the video data to define labels, wherein different combinations of the labels represent different conditions of one or more audience members in the presentation videos; and
   storing the structured data in memory.

3. The computer-implemented method of claim 2, wherein generating the structured data includes correlating certain presenter conditions with certain audience conditions, wherein different combinations of the influence factors represent different conditions of a presenter in the presentation videos.

4. The computer-implemented method of claim 1, wherein using the identified influence factors to determine a real-time condition of the active presenter includes:
   applying weighted values to predetermined ones of the identified influence factors.

5. The computer-implemented method of claim 1, wherein the virtual audience is presented visibly to the active presenter on a display screen.

6. The computer-implemented method of claim 1, wherein using the structured data from the training model to determine the audience condition which is most closely correlated to the real-time condition of the active presenter includes:
   calculating a distance between the real-time condition of the active presenter and each of the audience conditions represented in the training model; and
   selecting an audience condition having a closest distance to the real-time condition of the active presenter.

7. The computer-implemented method of claim 6, comprising:
   in response to determining that two or more audience conditions have a same closest distance to the real-time condition of the active presenter, calculating an average of the two or more audience conditions.

8. The computer-implemented method of claim 1, wherein each of the influence factors is selected from the group of categories consisting of: audio content, body movement, facial expressions, audio volume, and visual aid content, wherein sending one or more instructions to the web crawler to identify presentation videos on the internet and capture video data therefrom includes:
   sending search filters which specify types of videos the web crawler should identify, wherein the search filters specify videos with one or more specific search terms tagged thereto.

9. A computer program product comprising a computer readable storage medium having program instructions embodied therewith, the program instructions readable and/or executable by a processor to cause the processor to:
   receive, by the processor, new video data which corresponds to an active presenter;
   use, by the processor, the new video data to identify influence factors which correspond to the active presenter;
   use, by the processor, the identified influence factors to determine a real-time condition of the active presenter;
   use, by the processor, structured data from a training model to determine an audience condition which is most closely correlated to the real-time condition of the active presenter; and
   send, by the processor, one or more instructions to render a virtual simulation of an audience according to the one or more audience conditions, wherein the virtual simulation of the audience is presented visibly to the active presenter,
   wherein generating the structured data includes:
      sending one or more instructions to a web crawler to identify presentation videos on the internet and capture video data therefrom, and
      receiving, from the web crawler, video data which corresponds to various presentation videos on the internet, wherein capturing video data from the identified presentation videos on the internet includes:
    inspecting source code of existing web pages which correspond to the identified presentation videos, and
    using the source code to obtain the video data.

10. The computer program product of claim 9, wherein generating the structured data includes:
    using the video data to define influence factors, wherein different combinations of the influence factors represent different conditions of a presenter in the presentation videos;
    using the video data to define labels, wherein different combinations of the labels represent different conditions of one or more audience members in the presentation videos; and
    correlating certain presenter conditions with certain audience conditions.

11. The computer program product of claim 10, wherein the structured data is stored in memory, wherein sending one or more instructions to the web crawler to identify presentation videos on the internet and capture video data therefrom includes:
    sending search filters which specify types of videos the web crawler should identify, wherein the search filters specify videos with one or more specific words in their respective titles.

12. The computer program product of claim 10, wherein using the structured data from the training model to determine the audience condition which is most closely correlated to the real-time condition of the active presenter includes:
    calculating a distance between the real-time condition of the active presenter and each of the audience conditions represented in the training model; and
    selecting an audience condition having a closest distance to the real-time condition of the active presenter.

13. The computer program product of claim 12, the program instructions readable and/or executable by the processor to cause the processor to:
    in response to determining that two or more audience conditions have a same closest distance to the real-time condition of the active presenter, calculating an average of the two or more audience conditions.

14. The computer program product of claim 9, wherein using the identified influence factors to determine a real-time condition of the active presenter includes:
    applying weighted values to predetermined ones of the identified influence factors.

15. The computer program product of claim 9, wherein the virtual simulation of the audience is presented visibly to the active presenter on a display screen, wherein the virtual simulation of the audience is configured to react in real-time to actions made by the active presenter.

16. The computer program product of claim 9, wherein each of the influence factors is selected from the group of categories consisting of: audio content, body movement, facial expressions, audio volume, and visual aid content.

17. A system, comprising:
    memory;
    a processor; and
    logic integrated with the processor, executable by the processor, or integrated with and executable by the processor, the logic being configured to:
    receive, by the processor, new video data which corresponds to an active presenter;
    use, by the processor, the new video data to identify influence factors which correspond to the active presenter;
    use, by the processor, the identified influence factors to determine a real-time condition of the active presenter;
    use, by the processor, structured data from a training model to determine an audience condition which is most closely correlated to the real-time condition of the active presenter; and
    send, by the processor, one or more instructions to render a virtual simulation of an artificial audience according to the one or more audience conditions, wherein the virtual simulation of the artificial audience is presented visibly to the active presenter,
    wherein generating the structured data includes:
        sending one or more instructions to a web crawler to identify presentation videos on the internet and capture video data therefrom, and
        receiving, from the web crawler, video data which corresponds to various presentation videos on the internet,
        wherein capturing video data from the identified presentation videos on the internet includes:
            inspecting source code of existing web pages which correspond to the identified presentation videos, and
            using the source code to obtain the video data.

18. The system of claim 17,
    wherein different combinations of the influence factors represent different conditions of a presenter in the presentation videos,
    using the video data to define labels, wherein different combinations of the labels represent different conditions of one or more audience members in the presentation videos,
    wherein generating the structured data includes:
        correlating certain presenter conditions with certain audience conditions,
    wherein sending one or more instructions to the web crawler to identify presentation videos on the internet and capture video data therefrom includes:
        sending search filters which specify types of videos the web crawler should identify, wherein the search filters specify videos that have been organized under predetermined catalogs.

19. The system of claim 18, wherein using the structured data from the training model to determine the audience condition which is most closely correlated to the real-time condition of the active presenter includes:
    calculating a distance between the real-time condition of the active presenter and each of the audience conditions represented in the training model; and
    selecting an audience condition having a closest distance to the real-time condition of the active presenter.

20. The system of claim 17, wherein using the identified influence factors to determine a real-time condition of the active presenter includes:
    applying weighted values to predetermined ones of the identified influence factors,
    wherein each of the influence factors is selected from the group of categories consisting of: audio content, body movement, facial expressions, audio volume, and visual aid content,
    wherein the structured data is stored in the memory, wherein the virtual simulation of the artificial audience is configured to react in real-time to actions made by the active presenter.

\* \* \* \* \*